United States Patent
Chang et al.

(10) Patent No.: US 10,185,071 B2
(45) Date of Patent: Jan. 22, 2019

(54) LIGHT GUIDE PLATE, BACKLIGHT MODULE AND DISPLAY DEVICE

(71) Applicants: Radiant Opto-Electronics (Suzhou) Co.,Ltd., Jiangsu (CN); Radiant Opto-Electronics Corporation, Kaohsiung (TW)

(72) Inventors: Chia-Yin Chang, Kaohsiung (TW); Po-Chang Huang, Kaohsiung (TW); Shin-Bo Lin, Kaohsiung (TW)

(73) Assignees: Radiant Opto-Electronics (Suzhou) Co.,Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/688,857

(22) Filed: Aug. 28, 2017

(65) Prior Publication Data

US 2018/0100960 A1      Apr. 12, 2018

Related U.S. Application Data

(63) Continuation of application No. PCT/CN2016/101764, filed on Oct. 11, 2016.

(51) Int. Cl.
*G02F 1/1335* (2006.01)
*F21V 8/00* (2006.01)

(52) U.S. Cl.
CPC ......... *G02B 6/0028* (2013.01); *G02B 6/0088* (2013.01); *G02F 1/133602* (2013.01); *G02F 1/133615* (2013.01); *G09G 2320/0233* (2013.01)

(58) Field of Classification Search
CPC ................ G02B 6/0028; G02B 6/0088; G02F 1/133602
See application file for complete search history.

(56) References Cited

U.S. PATENT DOCUMENTS

| | | | |
|---|---|---|---|
| 2007/0177486 A1* | 8/2007 | Naoi | G02B 6/0028 369/112.19 |
| 2010/0128495 A1 | 5/2010 | Wang, et al. | |
| 2014/0132887 A1* | 5/2014 | Kurata | G02B 6/0018 349/65 |

FOREIGN PATENT DOCUMENTS

| | | |
|---|---|---|
| CN | 101042449 A | 9/2007 |
| CN | 102692671 A | 9/2012 |
| CN | 104049296 A | 9/2014 |

(Continued)

*Primary Examiner* — Lucy P Chien
(74) *Attorney, Agent, or Firm* — CKC & Partners Co., Ltd.

(57) ABSTRACT

A light guide plate, a backlight module and a display device are provided. The light guide plate includes a main body, first stripe microstructures, second stripe microstructures and third stripe microstructures. The main body includes a light incidence surface and an optic surface having a first area and a second area. The first area is disposed nearer the light incidence surface. The first stripe microstructures and the second stripe microstructures are respectively disposed on the first area and the second area. Each of the first stripe microstructures and the second stripe microstructures extends along the direction vertical to the light incidence surface. A width of one end of each second stripe microstructure near the light incidence surface is smaller than a width of the other end away from the light incidence surface. The third stripe microstructures are distributed on a partial or the whole region of the optic surface.

18 Claims, 8 Drawing Sheets

(56) References Cited

FOREIGN PATENT DOCUMENTS

| CN | 203930108 U | 11/2014 |
|---|---|---|
| CN | 105527671 A | 4/2016 |
| CN | 205427226 U | 8/2016 |

\* cited by examiner

LIGHT GUIDE PLATE, BACKLIGHT MODULE AND DISPLAY DEVICE

RELATED APPLICATIONS

This application is a continuation application of International Application No. PCT/CN2016/101764 filed on Oct. 11, 2016, which is incorporated herein by reference.

BACKGROUND

Field of Invention

The present invention relates to a light guide element and its application. More particularly, the present invention relates to a light guide plate and its applications in a backlight module and a display device.

Description of Related Art

A conventional backlight module mainly includes a light bar and a light guide plate. The light bar includes a circuit board and plural light-emitting diodes disposed on a surface of the circuit board. The light guide plate is disposed adjacent to the light-emitting diodes, and a light-incident surface of the light guide plate contacts a light-emitting surface of each of the light-emitting diodes, thereby effectively improving light efficiency generated from the light-emitting diodes. However, because the light-incident surface of the light guide plate is connected to the light-emitting surface of each of the light-emitting diodes, a hotspots phenomenon or a non-uniform brightness phenomenon is likely to occur on a portion of the light guide plate adjacent to the light-emitting diodes, thus seriously affecting the optical appearance of the light guide plate.

On the other hand, in order to mix the light passing through the light guide plate uniformly, prism microstructures are generally disposed on the light-emitting surfaces of the light guide plate. However, such prism microstructures would result in the light guide plate with too much light concentration and too strong light directivity. Consequently, the light guide plate will have has obvious brightness and darkness, and bright and dark bands, fringes or hotspots are generated thereon.

SUMMARY

An object of the invention is to provide a light guide plate, a backlight module and a display device, in which the light guide plate has plural stripe microstructures, thereby solving the problem of the non-uniform brightness phenomenon generated on the light guide plate and increasing illumination uniformity of the backlight module and the display device.

According to the aforementioned object, a light guide plate is provided. The light guide plate includes a main body, plural first stripe microstructures, plural second stripe microstructures and plural third stripe microstructures. The main body includes a light incidence surface and an optic surface connected to the light incidence surface, in which the optic surface has a first area and a second area, and the first area is disposed nearer the light incidence surface than the second area. The first stripe microstructures are disposed on the first area of the optic surface, and each of the first stripe microstructures extends along a direction which is vertical to the light incidence surface. The second stripe microstructures are disposed on the second area of the optic surface, and each of the second stripe microstructures extends along the direction which is vertical to the light incidence surface, and a width of one end of each second stripe microstructure near the light incidence surface is smaller than a width of the other end of each second stripe microstructure away from the light incidence surface. The third stripe microstructures are distributed on a partial or the whole region of the optic surface which is not implemented with the first stripe microstructures and the second stripe microstructures.

According to an embodiment of the present invention, an inherent type of the first stripe microstructures is different from an inherent type of the second stripe microstructures.

According to an embodiment of the present invention, each of the third stripe microstructures extends along the direction which is vertical to the light incidence surface.

According to an embodiment of the present invention, the first area and the second area are arranged along the direction which is vertical to the light incidence surface.

According to an embodiment of the present invention, each of the second stripe microstructures is a convex structure, and a height of one end of each second stripe microstructure near the light incidence surface is smaller than a height of the other end of each second stripe microstructure away from the light incidence surface.

According to an embodiment of the present invention, each of the second stripe microstructures is a concave structure, and a depth of one end of each second stripe microstructure near the light incidence surface is smaller than a depth of the other end of each second stripe microstructure away from the light incidence surface.

According to an embodiment of the present invention, the main body further includes a tapered portion and a plate portion, and the light incidence surface is located at a side of the tapered portion, and the optic surface is located on the plate portion.

According to an embodiment of the present invention, the first stripe microstructures are continuously arranged side by side.

According to an embodiment of the present invention, each of the first stripe microstructures includes a strip portion and a tapered structure, and the tapered structure is connected to one end of the strip portion which is away from the light incidence surface, and a width of the tapered structure becomes gradually smaller from one end of the tapered structure near the light incidence surface to the other end of the tapered structure away from the light incidence surface.

According to an embodiment of the present invention, each of the second stripe microstructures comprises a strip portion and a tapered structure, in which the tapered structure is connected to one end of the strip portion which is near the light incidence surface, and a width of the tapered structure becomes gradually greater from one end of the tapered structure near the light incidence surface to the other end of the tapered structure away from the light incidence surface.

According to an embodiment of the present invention, a first contour line is defined by an end portion of each first stripe microstructure, and a second contour line is defined by an end portion of each second stripe microstructure. Therefore, a fan-shape area can be defined between the first contour line and the second contour line.

According to an embodiment of the present invention, the third stripe microstructures include plural first structure units. One end of each of the first structure units is connected to the first stripe microstructures, and the other end of each of the first structure units is connected to the second stripe microstructures.

According to an embodiment of the present invention, the third stripe microstructures include plural second structure units. One end of each of the second structure units is connected to the first stripe microstructures, and the other end of each of the second structure units is connected to a side edge of the optic surface which is away from the light incidence surface.

According to an embodiment of the present invention, the third stripe microstructures include plural third structure units. One end of each of the third structure units, and one end of each of the third structure units is connected to a first side edge of the optic surface which is near the light incidence surface, and the other end of each of the third structure units is connected to a second side edge of the optic surface which is away from the light incidence surface.

According to an embodiment of the present invention, the third stripe microstructures include plural fourth structure units. One end of each of the fourth structure units is connected to a side edge of the optic surface which is near the light incidence surface, and the other end of each of the fourth structure units is connected to the second stripe microstructures.

According to an embodiment of the present invention, the third stripe microstructures include plural fifth structure units. One end of each of the fifth structure units is located between a first side edge of the optic surface which is near the light incidence surface and a second side edge of the optic surface which is away from the light incidence surface, and the other end of each of the fifth structure units is connected to the second side edge.

According to an embodiment of the present invention, the third stripe microstructures include plural sixth structure units. One end of each of the sixth structure units is located between a first side edge of the optic surface which is near the light incidence surface and a second side edge of the optic surface which is away from the light incidence surface, and the other end of each of the sixth structure units is connected to the second stripe microstructures.

According to the aforementioned object, a backlight module is provided. The backlight module includes the aforementioned light guide plate and a light source. The light source disposed adjacent to the light incidence surface of the light guide plate.

According to the aforementioned object, a display device is provided. The display device includes the aforementioned light guide plate, a light source and a display panel. The light source is disposed adjacent to the light incidence surface of the light guide plate. The display panel is disposed in front of the light guide plate.

It can be known from the aforementioned embodiments of the present invention that, the light guide plate of the present invention has at least three different types of stripe microstructures disposed on the optic surface of the light guide plate, and the shapes, the heights, the depths, or the arrangement manners of the stripe microstructures can be varied to change the optical trends and the light-gathering capability of the light guide plate, thereby increasing light luminance value and luminance uniformity of the light guide plate.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
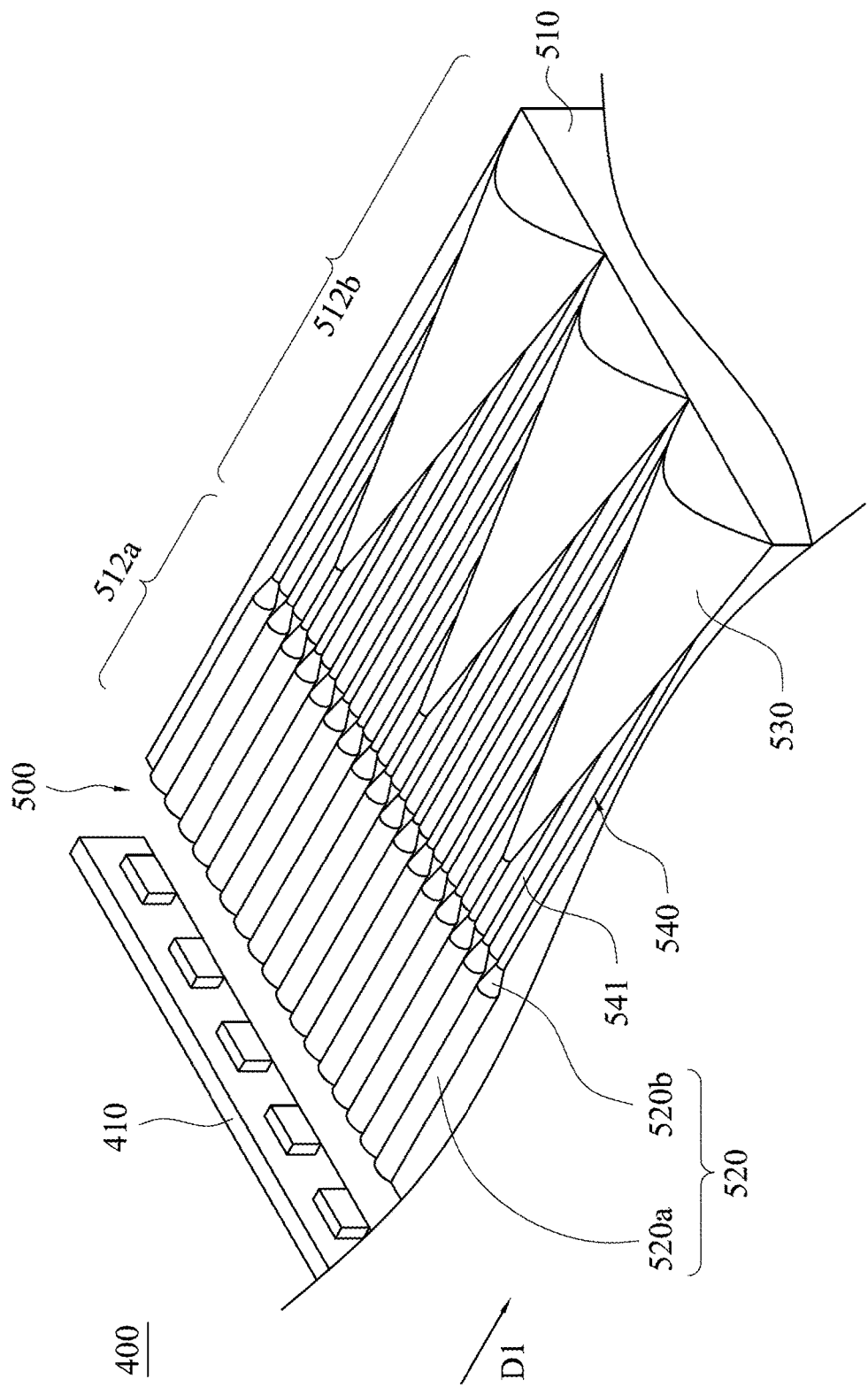
FIG. 1 illustrates a perspective view of a backlight module in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
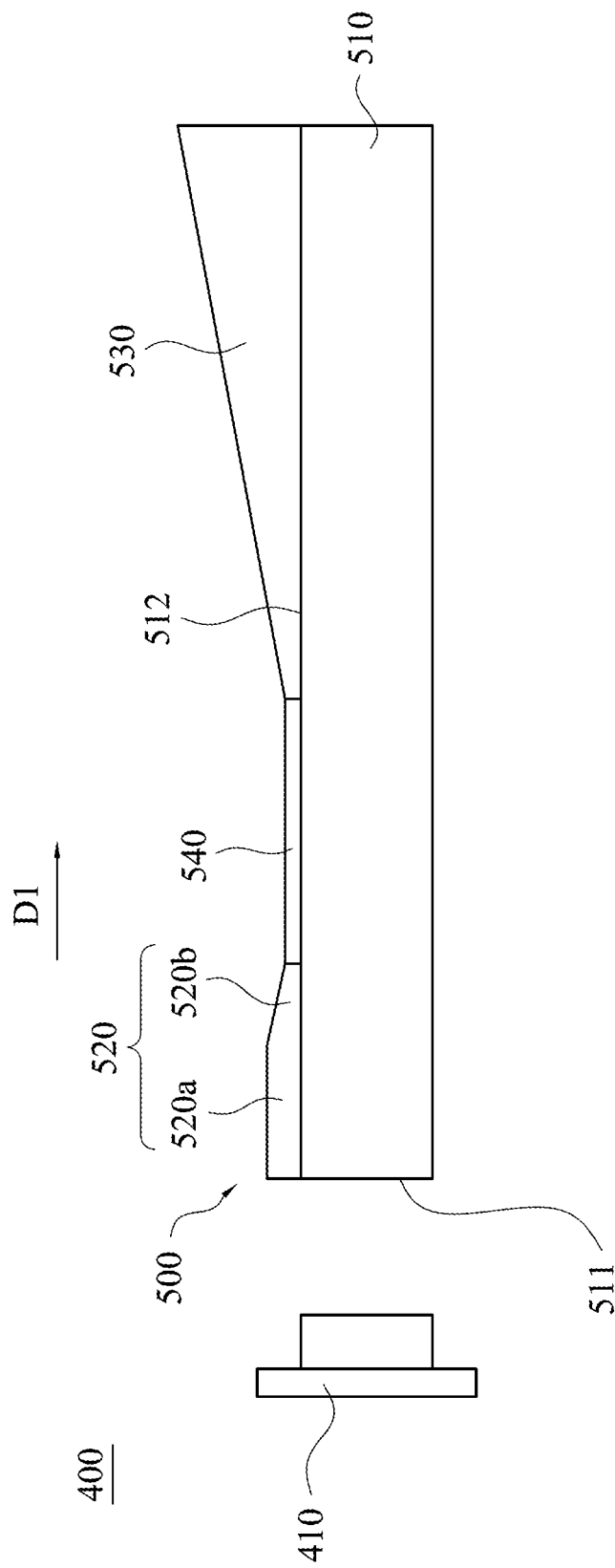
FIG. 2 is a cross-sectional view of the backlight module in accordance with the first embodiment of the present invention.

Referring to FIG. 1 and FIG. 2, FIG. 1 and FIG. 2 respectively illustrate a perspective view and a cross-sectional view of a backlight module 400 in accordance with a first embodiment of the present invention. The backlight module 400 of the present embodiment mainly includes a light guide plate 500 and a light source 410. The light source 410 is disposed at a side of the light guide plate 500. The light guide plate 500 mainly includes a main body 510, plural first stripe microstructures 520, plural second stripe microstructures 530 and plural third stripe microstructures 540. The first stripe microstructures 520, the second stripe microstructures 530 and the third stripe microstructures 540 are disposed on the main body 510. The first stripe microstructures 520 are mainly used to mix light leaked from a portion near the light-incident side of the light guide plate 500 to improve a non-uniform brightness phenomenon near the light-incident side. The second stripe microstructures 530 are used to control optical trends of the light guide plate 500, thereby solving the problem of bright bands generated on the light guide plate 500. The third stripe microstructures 540 are used to increase light-emitting efficiency and uniformity of the overall light-emitting appearance of the light guide plate 500. As shown in FIG. 1 and FIG. 2, the main body 510 of the light guide plate 500 mainly includes a light incidence surface 511 and an optic surface 512 connected to the light incidence surface 511. The optic surface 512 has a first area 512*a* and a second area 512*b*, in which the first area 512*a* is disposed nearer the light incidence surface 511 than the second area 512*b*. In the present embodiment, the first area 512*a* and the second area 512*b* are arranged along a direction D1, in which the direction D1 is vertical to the light incidence surface 511. As shown in FIG. 1 and FIG. 2, the first stripe microstructures 520 are disposed in the first area 512*a*, and each of the first stripe microstructures 520 extends along the direction D1. The second stripe microstructures 530 are disposed in the second area 512*b*, and each of the stripe microstructures 530 also extends along the direction D1. In the present embodiment, an inherent type of the first stripe microstructures 520 is different from an inherent type of second stripe microstructures 530. It is noted that, the "inherent type" used herein means the shapes or the arrangement densities of the first stripe microstructures 520 and the second stripe microstructures 530.

Referring to FIG. 1 and FIG. 2, each of the first stripe microstructures 520 includes a strip portion 520a and a tapered structure 520b. The tapered structure 520b of each first stripe microstructure 520 is connected to an end of the strip portion 520a which is away from the light incidence surface 511. A width of the tapered structure 520b becomes gradually smaller from one end of the tapered structure 520b near the light incidence surface 511 to the other end of the tapered structure 520b away from the light incidence surface 511. The strip portion 520a has a uniform width. On the other hand, each of the second stripe microstructures 530 is a tapered structure. A width of one end of each second stripe microstructure 530 near the light incidence surface 511 is smaller than a width of the other end of each second stripe microstructure 530 away from the light incidence surface 511. Therefore, light leaked from a portion of the light guide plate 500 near the light incidence surface 511 can be mixed by the first stripe microstructures 520. Moreover, light luminance of an area of the optic surface 512 near the light incidence surface 511 can be adjusted to be consistent with light luminance of an area of the optic surface 512 away from the light incidence surface 511 by the second stripe microstructures 530.

Referring to FIG. 1 and FIG. 2 again, in the present embodiment, the third stripe microstructures 540 are distributed on the whole region of the optic surface 512 which is not implemented with the first stripe microstructures 520 and the second stripe microstructures 530. Each of the third stripe microstructures 540 extends along the direction D1, thereby increasing the light-emitting efficiency and uniformity of the overall light-emitting appearance of the light guide plate 500. In the present embodiment, the first stripe microstructures 520 are continuously arranged side by side, and the second stripe microstructures 530 are also continuously arranged side by side. The third stripe microstructures 540 include plural first structure units 541. As shown in FIG. 1, one end of each first structure unit 541 is connected to the first stripe microstructures 520, and the other end of each first structure unit 541 is connected to the second stripe microstructures 530. In the present embodiment, the third stripe microstructures 540 are continuously arranged side by side, but not limited thereto. In other embodiments, the third stripe microstructures 540 can be discontinuously arranged.

Figure 3:
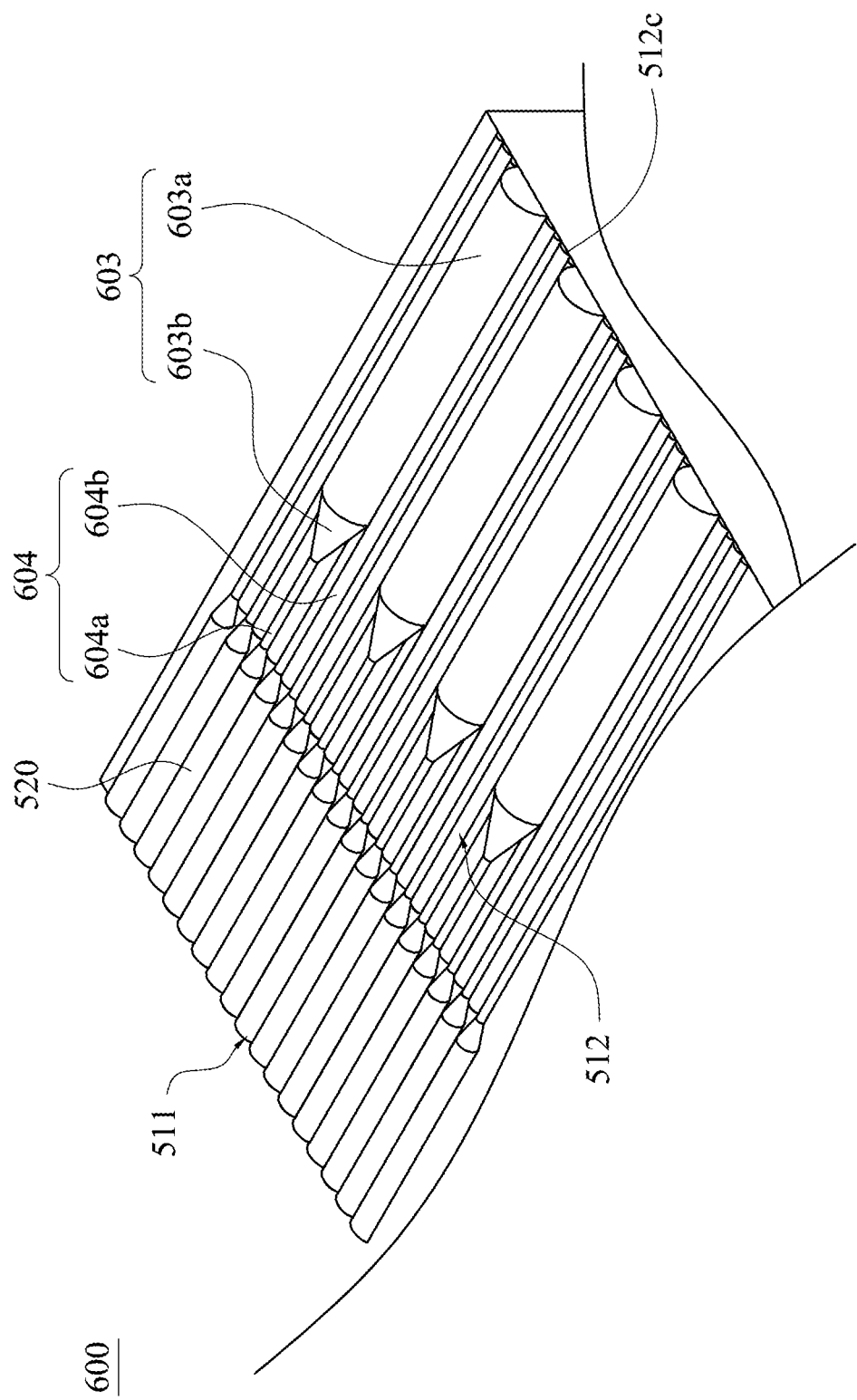
FIG. 3 illustrates a partial perspective view of a light guide plate in accordance with a second embodiment of the present invention.

In the present invention, the third stripe microstructures may have different designs according to the arrangement manners or the structural shapes of the first stripe microstructures and the second stripe microstructures. Referring to FIG. 3, FIG. 3 illustrates a partial perspective view of a light guide plate 600 in accordance with a second embodiment of the present invention. The structure of the light guide plate 600 shown in FIG. 3 is similar to that of the light guide plate 500 shown in FIG. 1, and the main difference therebetween is that second stripe microstructures 603 and third stripe microstructures 604 of the light guide plate 600 have different designs. As shown in FIG. 3, a portion of each second stripe microstructure 603 is a tapered structure, and the second stripe microstructures 603 are separated from each other by a distance. In addition, each of the second stripe microstructures 603 includes a strip portion 603a and a tapered structure 603b. The tapered structure 603b is connected to one end of the strip portion 603a which is near the light incidence surface 511. A width of the tapered structure 603b becomes gradually greater from one end of the tapered structure 603b near the light incidence surface 511 to the other end away from the light incidence surface 511. The strip portion 603a has a uniform width.

Referring to FIG. 3 again, in the present embodiment, the third stripe microstructures 604 includes plural first structure units 604a and plural second structure units 604b. One end of each first structure unit 604a is connected to the first stripe microstructures 520, and the other end of each first structure unit 604a is connected to the second stripe microstructures 603. One end of each second structure unit 604b is connected to the first stripe microstructures 520, and the other end of each second structure unit 604b is connected to a side edge 512c of the optic surface 512 which is away from the light incidence surface 511. Therefore, the third stripe microstructures 604 can achieve the same object as the third stripe microstructures 540, and therefore will not be described again herein. In the present embodiment, the third stripe microstructures 604 are continuously arranged side by side, but not limited thereto. In other embodiments, the third stripe microstructures 604 can be discontinuously arranged.

Figure 4:
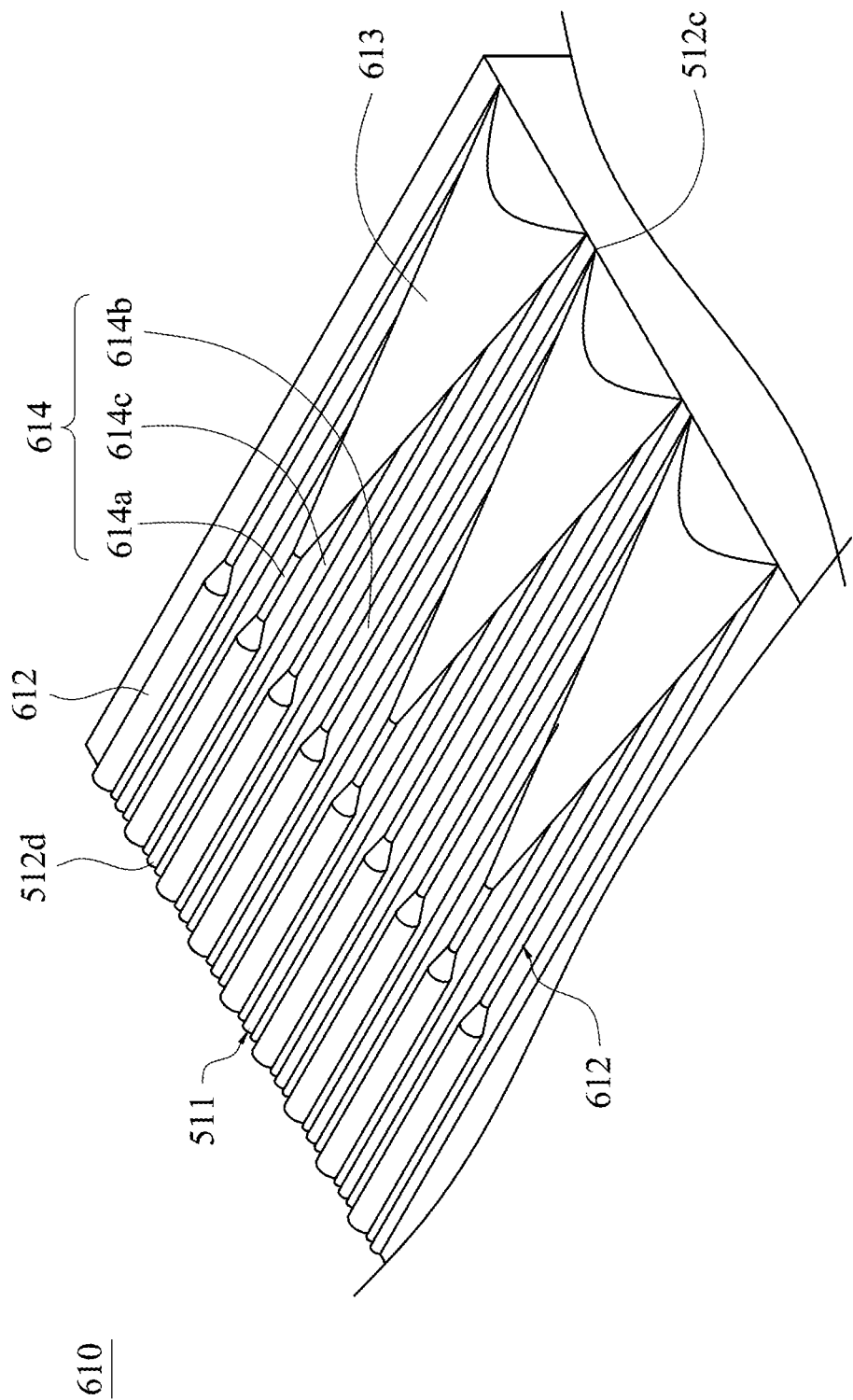
FIG. 4 illustrates a partial perspective view of a light guide plate in accordance with a third embodiment of the present invention.

Referring to FIG. 4, FIG. 4 illustrates a partial perspective view of a light guide plate 610 in accordance with a third embodiment of the present invention. The structure of the light guide plate 610 shown in FIG. 4 is similar to that of the light guide plate 500 shown in FIG. 1 and FIG. 2, and the main difference therebetween is that first stripe microstructures 612, second stripe microstructures 613 and third stripe microstructures 614 of the light guide plate 610 have different designs. As shown in FIG. 4, the first stripe microstructures 612 on the light guide plate 610 are separated from each other by a distance, and the second stripe microstructures 613 are also separated from each other by a distance.

Referring to FIG. 4, in the present embodiment, the third stripe microstructures 614 include plural first structure units 614a, plural third structure units 614b and plural fourth structure units 614c. One end of each first structure unit 614a is connected to the first stripe microstructures 612, and the other end of each first structure unit 614a is connected to the second stripe microstructures 613. In addition, one end of each third structure unit 614b is connected to a side edge 512d of the optic surface 512 which is near the light incidence surface 51, and the other end of each third structure unit 614b is connected to the side edge 512c of the optic surface 512 which is away from the light incidence surface 511. Moreover, one end of each fourth structure unit 614c is connected to the side edge 512d of the optic surface 512 which is near the light incidence surface 511, and the other end of each fourth structure unit 614c is connected to the second stripe microstructures 613. Therefore, third stripe microstructures 614 can achieve the same object as the third stripe microstructures 540, and therefore will not be described again herein. In the present embodiment, the third stripe microstructures 614 are continuously arranged side by side, but not limited thereto. In other embodiments, the third stripe microstructures 614 can be discontinuously arranged.

Figure 5:
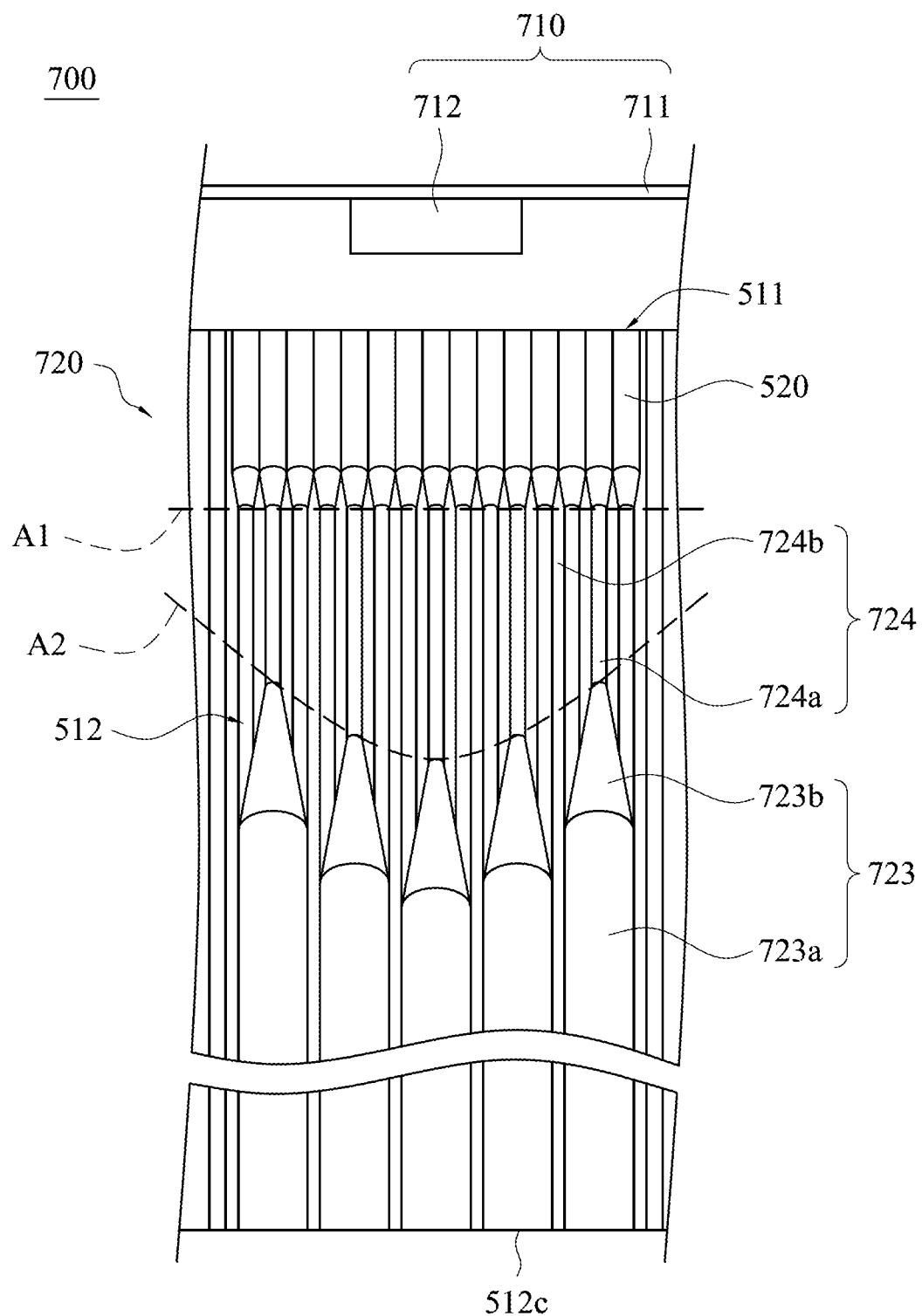
FIG. 5 illustrates a partial perspective view of a backlight module in accordance with a fourth embodiment of the present invention.

It is noted that, in the aforementioned embodiments, distances between each second stripe microstructure and the light incidence surface are the same. In other embodiments, distances between each second stripe microstructure and the light incidence surface can be designed according to a radiation pattern generated by the light source. Referring to FIG. 5, FIG. 5 illustrates a partial perspective view of a backlight module 700 in accordance with a fourth embodiment of the present invention. The backlight module 700 of the present embodiment mainly includes a light source 710 and a light guide plate 720. The light source 710 is disposed at a light-incident side of the light guide plate 720 and includes a circuit board 711 and plural light-emitting diodes 712 disposed on the circuit board 711. The structure of the light guide plate 720 shown in the present embodiment is similar to that of the light guide plate 500 shown in FIG. 1 and FIG. 2, and the main difference therebetween is that second stripe microstructures 723 and third stripe microstructures 724 of the light guide plate 720 have different designs.

As shown in FIG. 5, the second stripe microstructures 723 are separated from each other by a distance. In addition, each of the second stripe microstructures 723 includes a strip portion 723a and a tapered structure 723b. The tapered structure 723b is connected to an end of the strip portion 723a which is near the light incidence surface 511. A width of the tapered structure 723b becomes gradually greater from one end of the tapered structure 723b near the light incidence surface 511 to the other end away from the light incidence surface 511. The strip portion 723a has a uniform width. In the present embodiment, light emitted from each of the light-emitting diodes 712 is scattered into the light guide plate 720, and a region of the light guide plate 720 which is in front of the light-emitting diodes 712 receives more light quantity than a region of the light guide plate 720 which is not in front of the light-emitting diodes 712. Therefore, in the present embodiment, the distances between the light incidence surface 511 and the second stripe microstructures 723 located in front of the light-emitting diodes 712 are greater than the distances between the light incidence surface 511 and the second stripe microstructures 723 not located in front of the light-emitting diodes 712, so that a fan-shape area is formed between the first stripe microstructures 520 and the second stripe microstructures 723. In other words, the fan-shape area is formed between a first contour line A1 and a second contour line A2, in which the first contour line A1 is defined by an end portion of each first stripe microstructure 520, and the second contour line A2 is defined by an end portion of each second stripe microstructure 723. Therefore, light quantity emitted from the second stripe microstructures 723 which are not located in front of the light-emitting diodes 712 is more efficiency than that emitted from the second stripe microstructures 723 which are located in front of the light-emitting diodes 712, thereby uniforming light luminance of the light guide plate 720.

Referring to FIG. 5 again, in the present embodiment, the third stripe microstructures 724 include plural first structure units 724a and plural second structure units 724b. One end of each first structure unit 724a is connected to the first stripe microstructures 520, the other end of each first structure unit 724a is connected to the second stripe microstructures 723. One end of each second structure units 724b is connected to the first stripe microstructures 520, the other end of each second structure units 724b is connected to the side edge 512c of the optic surface 512 away from the light incidence surface 511. Therefore, the third stripe microstructures 724 can achieve the same object as the third stripe microstructures 540, and therefore will not be described again herein. In the present embodiment, the third stripe microstructures 724 are continuously arranged side by side, but not limited thereto. In other embodiments, the third stripe microstructures 724 can be discontinuously arranged.

Figure 6:
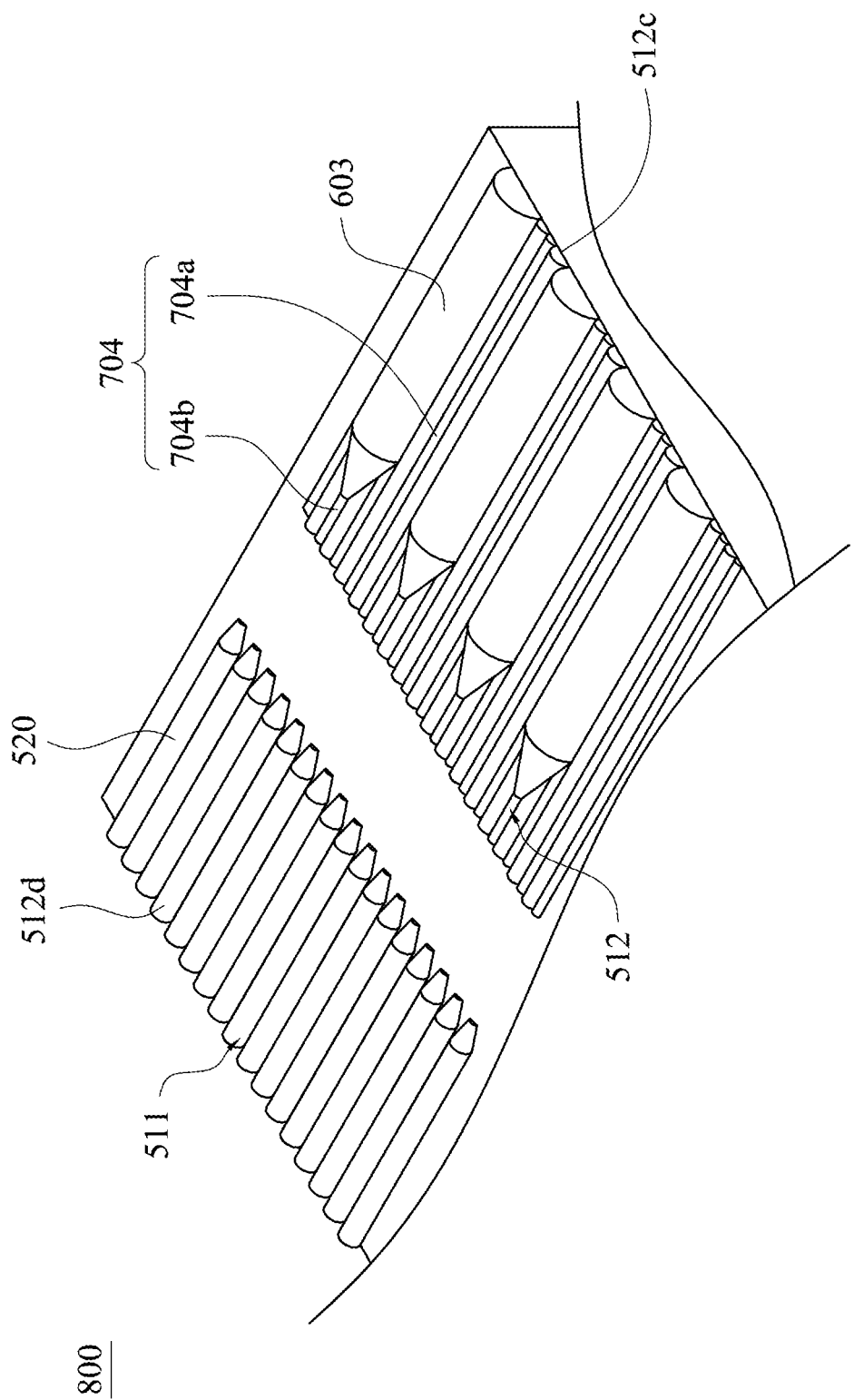
FIG. 6 illustrates a partial perspective view of a light guide plate in accordance with a fifth embodiment of the present invention.

It is noted that, it is not limited that the third stripe microstructures are distributed on the whole region of optic surface 512 which is not implemented with the first stripe microstructures and the second stripe microstructures. In other embodiments, the third stripe microstructures can be only distributed on a partial region of the optic surface which is not implemented with the first stripe microstructures and the second stripe microstructures. Referring to FIG. 6, FIG. 6 illustrates a partial perspective view of a light guide plate 800 in accordance with a fifth embodiment of the present invention. The structure of the light guide plate 800 shown in FIG. 6 is similar to that of the light guide plate 600 shown in FIG. 3, and the main difference therebetween is that third stripe microstructures 704 of the light guide plate 800 have different designs.

Referring to FIG. 6 again, in the present embodiment, the third stripe microstructures 704 include plural fifth structure units 704a and plural sixth structure units 704b. One end of each fifth structure unit 704a is located between the side edge 512d of the optic surface 512 near the light incidence surface 511 and the side edge 512c of the optic surface 512 away from the light incidence surface 511, and the other end of each fifth structure unit 704a is connected to the side edge 512c. In other words, one end of each fifth structure unit 704a is not connected to the side edge 512d or the first stripe microstructures 520, and the other each fifth structure unit 704a is directly connected to the side edge 512c. As shown in FIG. 6, one end of each sixth structure unit 704b is located between the side edge 512d of the optic surface 512 near the light incidence surface 511 and the side edge 512c of the optic surface 512 away from the light incidence surface 511, and the other end of each sixth structure unit 704b is connected to the second stripe microstructures 603. In other words, one end of each sixth structure unit 704b is not connected to the side edge 512d or the first stripe microstructures 520, and the other end of each sixth structure unit 704b is directly connected to the second stripe microstructures 603. Therefore, the third stripe microstructures 704 can achieve the same object as the aforementioned third stripe microstructures 604, and therefore will not be described again herein. In the present embodiment, the third stripe microstructures 704 are continuously arranged side by side, but not limited thereto. In other embodiments, the third stripe microstructures 704 can be discontinuously arranged.

It is noted that, the present invention is not limited to the aforementioned types of the third stripe microstructures and can be extended to any type of third stripe microstructures. In different embodiments, the third stripe microstructures may include the first structure units, second structure units, third structure units, fourth structure units, fifth structure units and sixth structure units, or any combination thereof, so as to meet different requirements. It is noted that, the terms "first", "second", "third", "fourth", "fifth" and "sixth" recited in the specification are merely used to name the elements and should not be regarded as the order or the number of the elements.

Figure 7:
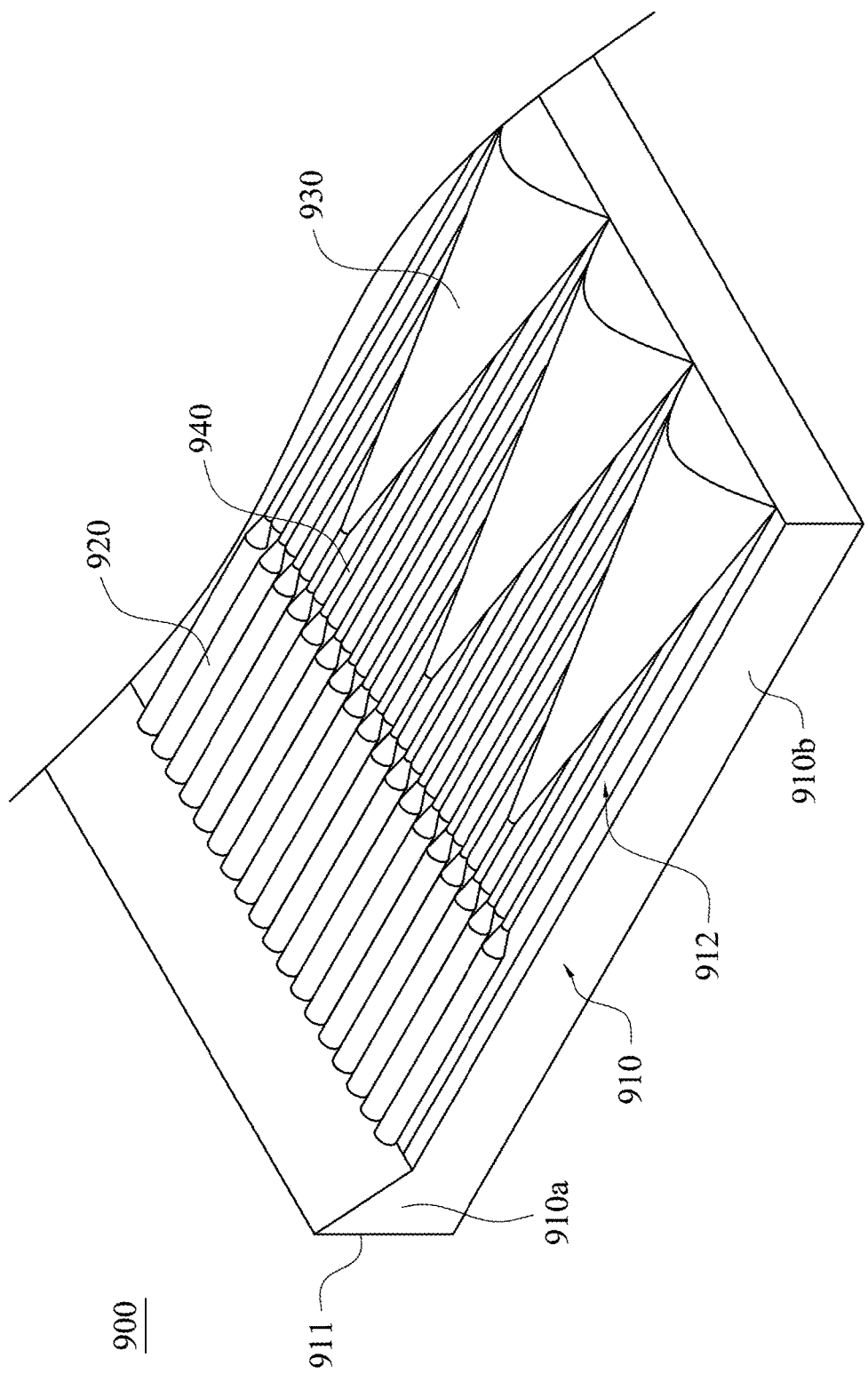
FIG. 7 illustrates a partial perspective view of a light guide plate in accordance with a sixth embodiment of the present invention.

The main body of the light guide plate of the present invention may be a main body with a non-uniform thickness. Referring to FIG. 7, FIG. 7 illustrates a partial perspective view of a light guide plate 900 in accordance with a sixth embodiment of the present invention. The structure of the light guide plate 900 of the present embodiment is similar to that of the light guide plate 500 shown in FIG. 1, and the main difference therebetween is that a main body 910 of the light guide plate 900 has different designs.

As shown in FIG. 7, the light guide plate 900 mainly includes a main body 910, plural first stripe microstructures 920, plural second stripe microstructures 930 and plural third stripe microstructures 940. The first stripe microstructures 920, second stripe microstructures 930 and third stripe microstructures 940 are disposed on the main body 910. In the present embodiment, the main body 910 further includes a tapered portion 910a and a plate portion 910b. The main body 910 has a light incidence surface 911 and an optic surface 912. The light incidence surface 911 is located at a side of the tapered portion 910a, and the optic surface 912 is located on the plate portion 910b. In addition, a thickness of one end of the tapered portion 910a near the light incidence surface 911 is greater than a thickness of the other end of the tapered portion 910a away from the light incidence surface 911. In the present embodiment, the first stripe microstructures 920, the second stripe microstructures 930 and the third stripe microstructures 940 are disposed on the optic surface 912. It is noted that, structures of the first stripe microstructures 920, the second stripe microstructures 930 and the third stripe microstructures 940 are similar to those of the aforementioned first stripe microstructures 520 and 612, the second stripe microstructures 530, 603, 613 and 723, and the third stripe microstructures 540, 604, 614, 704 and 724, which will not be described again herein.

In the aforementioned embodiments, the second stripe microstructures 530, 603, 613, 723 and 930 are convex structures, and a height of one end of each second stripe microstructures 530, 603, 613, 723 and 930 near the light incidence surface 511 is smaller than a height of the other end away from the light incidence surface 511. In other embodiments, each of the second stripe microstructures can be a concave structure, and a depth of one end of each second stripe microstructure near the light incidence surface is smaller than a depth of the other end of each second stripe microstructure away from the light incidence surface.

Figure 8:
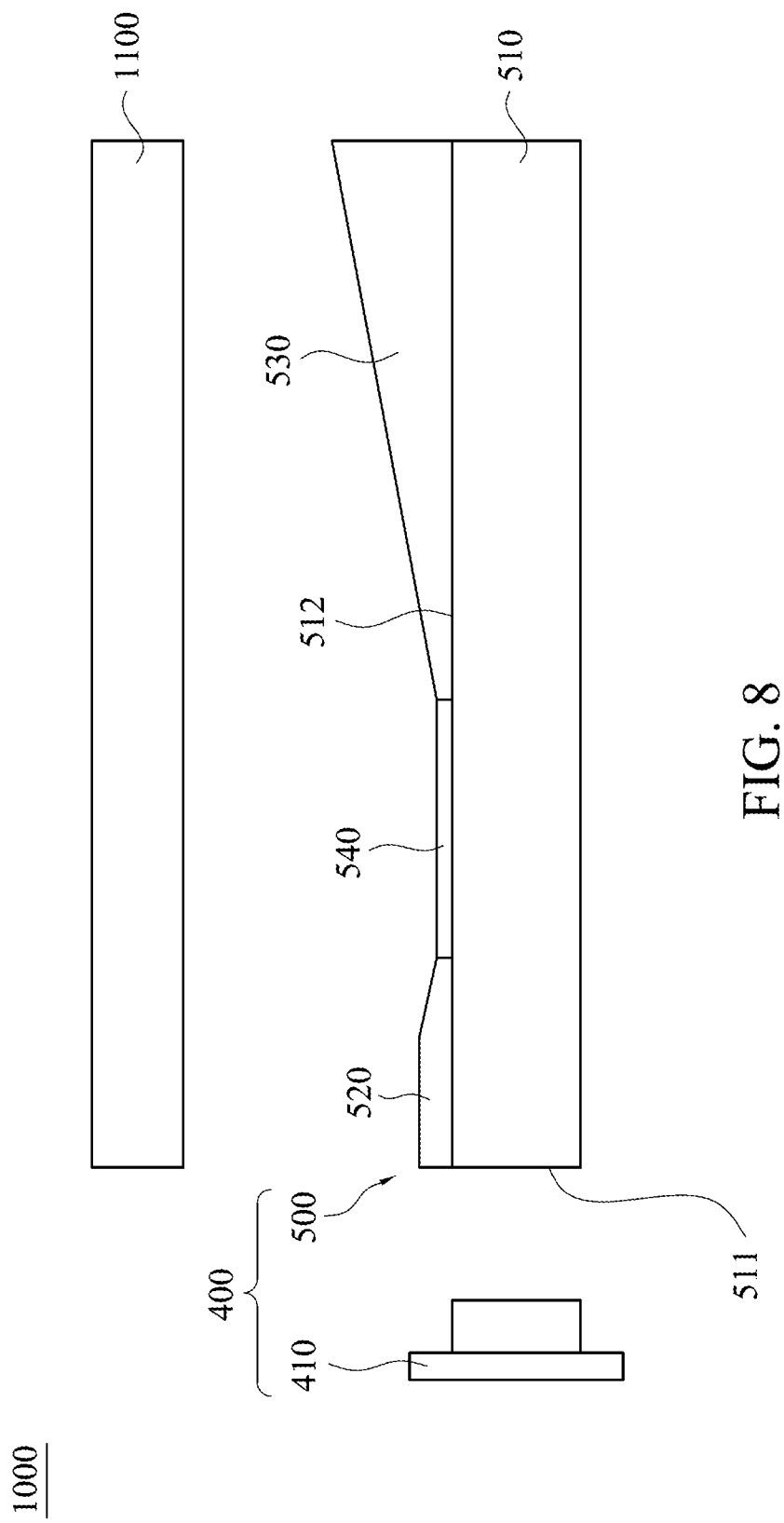
FIG. 8 illustrates a perspective view of a display device in accordance with an embodiment of the present invention.

Referring to FIG. 8, FIG. 8 illustrates a perspective view of a display device in accordance with an embodiment of the present invention. The display device 1000 includes the backlight module 400 as shown in FIG. 1 and FIG. 2 and a display panel 1100. As shown in FIG. 8, the display panel 1100 is disposed in front of the light guide plate 500 of the backlight module 400, so as to achieve the same objective as described above, and therefore will not be described again herein. It is noted that, the backlight module 400 shown in FIG. 26 which has the light guide plate 500 is merely used as an example applied to the display device 1000 for explanation, and embodiments of the present invention are not limited thereto. In other embodiments, other light guide plates, such as the light guide plates 500, 600, 610, 720, 800 and 900, of the aforementioned embodiments also can be applied to a display device, so as to achieve the same effect.

It can be known from the aforementioned embodiments of the present invention that, the light guide plate of the present invention has at least three different types of stripe microstructures disposed on the optic surface of the light guide plate, and the shapes, the heights, the depths, or the arrangement manners of the stripe microstructures can be varied to change the optical trends and the light-gathering capability of the light guide plate, thereby increasing light luminance value and luminance uniformity of the light guide plate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
a main body, comprising a light incidence surface and an optic surface connected to the light incidence surface, wherein the optic surface has a first area and a second area, and the first area is disposed nearer the light incidence surface than the second area;
a plurality of first stripe microstructures disposed on the first area of the optic surface, wherein each of the first stripe microstructures extends along a direction which is vertical to the light incidence surface;
a plurality of second stripe microstructures disposed on the second area of the optic surface, wherein each of the second stripe microstructures extends along the direction which is vertical to the light incidence surface, and a width of one end of each second stripe microstructure near the light incidence surface is smaller than a width of the other end of each second stripe microstructure away from the light incidence surface; and
a plurality of third stripe microstructures distributed on a partial or the whole region of the optic surface which is not implemented with the first stripe microstructures and the second stripe microstructures; wherein each of the third stripe microstructures extends along the direction which is vertical to the light incidence surface.

2. The light guide plate according to claim 1, wherein an inherent type of the first stripe microstructures is different from an inherent type of the second stripe microstructures.

3. The light guide plate according to claim 1, wherein the first area and the second area are arranged along the direction which is vertical to the light incidence surface.

4. The light guide plate according to claim 1, wherein each of the second stripe microstructures is a convex structure, and a height of one end of each second stripe microstructure near the light incidence surface is smaller than a height of the other end of each second stripe microstructure away from the light incidence surface.

5. The light guide plate according to claim 1, wherein each of the second stripe microstructures is a concave structure, and a depth of one end of each second stripe microstructure near the light incidence surface is smaller than a depth of the other end of each second stripe microstructure away from the light incidence surface.

6. The light guide plate according to claim 1, wherein the main body further comprises a tapered portion and a plate portion, and the light incidence surface is located at a side of the tapered portion, and the optic surface is located on the plate portion.

7. The light guide plate according to claim 1, wherein the first stripe microstructures are continuously arranged side by side.

8. The light guide plate according to claim 1, wherein each of the first stripe microstructures comprises a strip portion and a tapered structure, and the tapered structure is connected to one end of the strip portion which is away from the light incidence surface, and a width of the tapered structure becomes gradually smaller from one end of the tapered structure near the light incidence surface to the other end of the tapered structure away from the light incidence surface.

9. The light guide plate according to claim 1, wherein each of the second stripe microstructures comprises a strip portion and a tapered structure, wherein the tapered structure is connected to one end of the strip portion which is near the light incidence surface, and a width of the tapered structure becomes gradually greater from one end of the tapered structure near the light incidence surface to the other end of the tapered structure away from the light incidence surface.

10. The light guide plate according to claim 1, wherein a first contour line is defined by an end portion of each first stripe microstructure, and a second contour line is defined by an end portion of each second stripe microstructure, wherein a fan-shape area is defined between the first contour line and the second contour line.

11. The light guide plate according to claim 1, wherein the third stripe microstructures comprises a plurality of first structure units, and one end of each of the first structure units is connected to the first stripe microstructures, and the other end of each of the first structure units is connected to the second stripe microstructures.

12. The light guide plate according to claim 1, wherein the third stripe microstructures comprises a plurality of second structure units, and one end of each of the second structure units is connected to the first stripe microstructures, and the other end of each of the second structure units is connected to a side edge of the optic surface which is away from the light incidence surface.

13. The light guide plate according to claim 1, wherein the third stripe microstructures comprises a plurality of third structure units, and one end of each of the third structure units, and one end of each of the third structure units is connected to a first side edge of the optic surface which is near the light incidence surface, and the other end of each of the third structure units is connected to a second side edge of the optic surface which is away from the light incidence surface.

14. The light guide plate according to claim 1, wherein the third stripe microstructures comprises a plurality of fourth structure units, and one end of each of the fourth structure units is connected to a side edge of the optic surface which is near the light incidence surface, and the other end of each of the fourth structure units is connected to the second stripe microstructures.

15. The light guide plate according to claim 1, wherein the third stripe microstructures comprises a plurality of fifth structure units, and one end of each of the fifth structure units is located between a first side edge of the optic surface which is near the light incidence surface and a second side edge of the optic surface which is away from the light incidence surface, and the other end of each of the fifth structure units is connected to the second side edge.

16. The light guide plate according to claim 1, wherein the third stripe microstructures comprises a plurality of sixth structure units, and one end of each of the sixth structure units is located between a first side edge of the optic surface which is near the light incidence surface and a second side edge of the optic surface which is away from the light incidence surface, and the other end of each of the sixth structure units is connected to the second stripe microstructures.

17. A backlight module, comprising:
   a light guide plate as claimed in claim 1; and
   a light source disposed adjacent to the light incidence surface of the light guide plate.

18. A display device, comprising:
   a light guide plate as claimed in claim 1;
   a light source disposed adjacent to the light incidence surface of the light guide plate; and
   a display panel disposed in front of the light guide plate.

* * * * *